GEORGE LITTLE

Improvement in Switches for Galvanic Batteries.

No. 115,966.

Patented June 13, 1871.

UNITED STATES PATENT OFFICE.

GEORGE LITTLE, OF RUTHERFORD PARK, NEW JERSEY.

IMPROVEMENT IN SWITCHES FOR GALVANIC BATTERIES.

Specification forming part of Letters Patent No. 115,966, dated June 13, 1871.

*To all whom it may concern:*

Be it known that I, GEORGE LITTLE, of Rutherford Park, in the county of Bergen and State of New Jersey, have invented an Improvement in Telegraphic Apparatus; and the following is declared to be a correct description thereof.

This invention is for throwing one battery out of action after bringing into action a battery that has been out of use, and effecting this periodically, as it is found in practice that the power of a battery will be maintained the most efficiently by periods of inaction; hence two batteries can be advantageously made use of alternately. The device for disconnecting one battery and connecting another is usually termed a "rheotome;" and my invention consists in a peculiar construction of the circuit closing and breaking mechanism that insures a more perfect electrical contact, less risk of derangement by particles of dust or other foreign substances, and a uniform action of the batteries is maintained. My rheotome is especially adapted to use with the batteries in telegraph composing-machines for punching strips of paper, but may be employed for other machinery or telegraphic apparatus.

Figure 1:
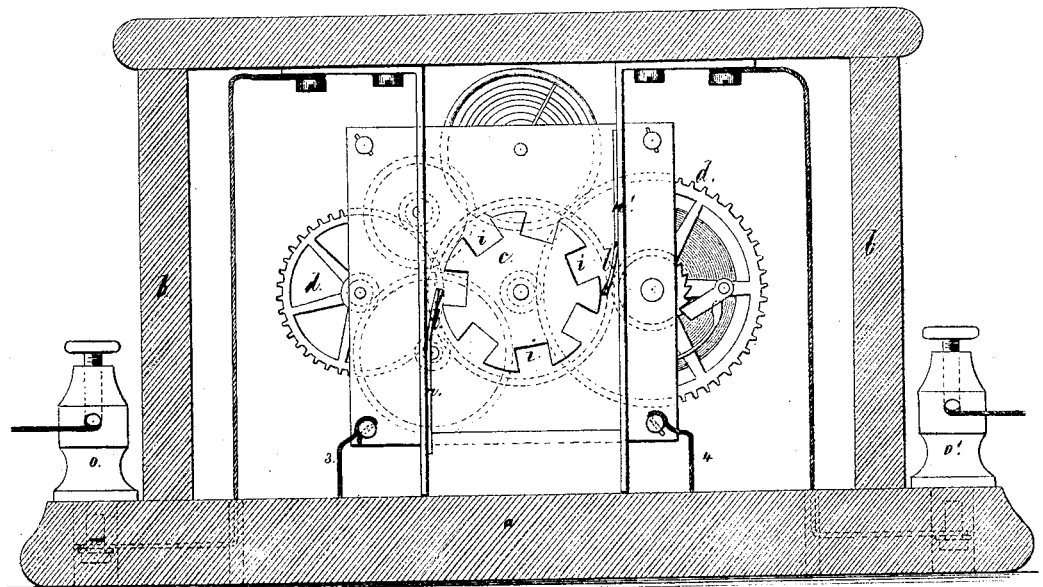
Figure 2:
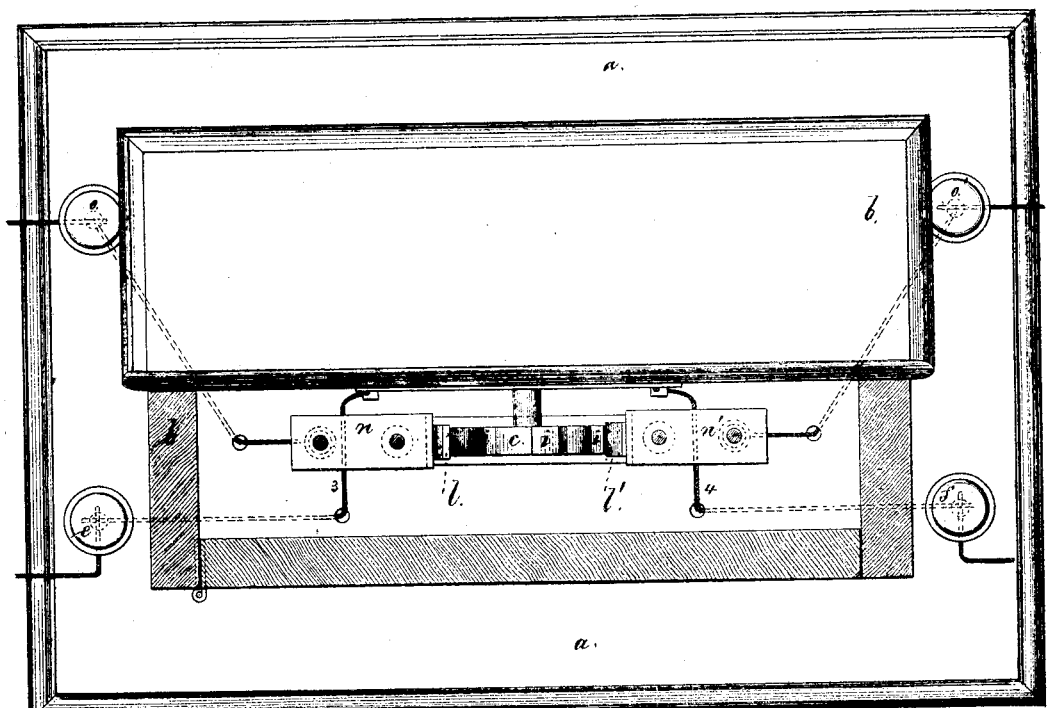

In the drawing, Figure 1 is an elevation of the circuit-breaker and actuating clock-work, and Fig. 2 is a plan of the parts, the case being partially in section.

The instrument is to be connected to a stand, $a$, and an inclosing-box or case, $b$, may be employed to protect the parts from dust. A clock movement of any desired kind is employed to give motion to the circuit-closer, and this circuit-closer is made as a wheel, $c$, having notches or spaces $i$ at suitable distances apart around its periphery. I have shown a clock movement at $d$, and with this clock movement the two batteries are put into connection, as shown by the wires 3 4 and binding-screws $e f$, so that the wheel $i$ is also in metallic connection with both batteries. The springs $l\ l'$ are made with platina ends, and are held by the spring-bars $n\ n'$ that are insulated but connected to the respective battery-binding screws $o\ o'$, and these parts are so positioned and constructed that the wheel $i$, as it revolves slowly, closes the circuit with one of the batteries by the contact of its periphery with the spring $l$ or $l'$. The contact of the periphery with the other spring $l'$ or $l$ is broken to give a pause to the battery with which it is connected, and before the circuit to one battery is broken that to the other is closed, so that either one battery is in full action, and the other is thrown out or allowed an interval of rest or inaction. The periphery of the wheel $c$ may be covered with platina, and I remark that the springs $l\ l'$ and bars $n\ n'$ can be bent from time to time, so as to cause the ends of the springs $l\ l'$ to bear with but very little force on the wheel $c$; hence there is but little friction, and, by the sliding movement of the surface of the wheel $c$ against the springs $l\ l'$, the surfaces in contact are kept free from all dust or foreign substance that might obstruct the operation.

I am aware that two batteries, a circuit-breaking and closing device, and a clock movement, have been employed for bringing the batteries alternately into action, and that this has heretofore been effected through the agency of a local-battery circuit and magnet to connect one of the batteries and simultaneously disconnect the other.

I claim as my invention—

The automatic circuit-closing wheel $c$, in combination with springs $l\ l'$, and connections to two batteries, substantially as specified, whereby the circuit to each battery is automatically broken and closed through said wheel $c$, as set forth.

Signed by me this 11th day of April, A. D. 1871.

GEORGE LITTLE.

Witnesses:
CHAS. H. SMITH,
GEO. T. PINCKNEY.